Oct. 14, 1958
E. R. FAUSSET
2,856,054
CONVEYING MECHANISM
Filed Dec. 8, 1953
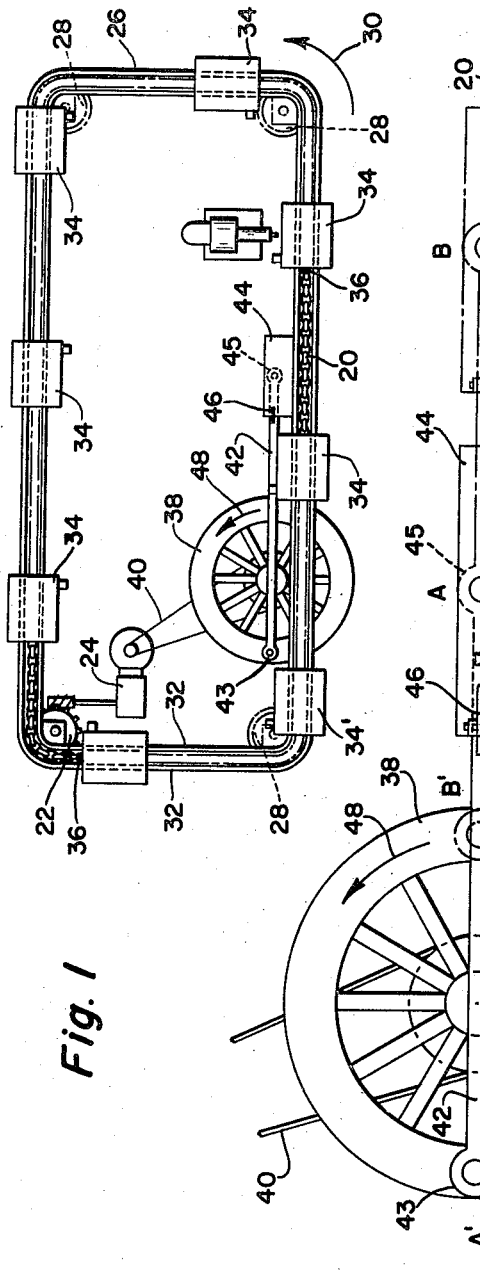
Fig. 1
Fig. 2
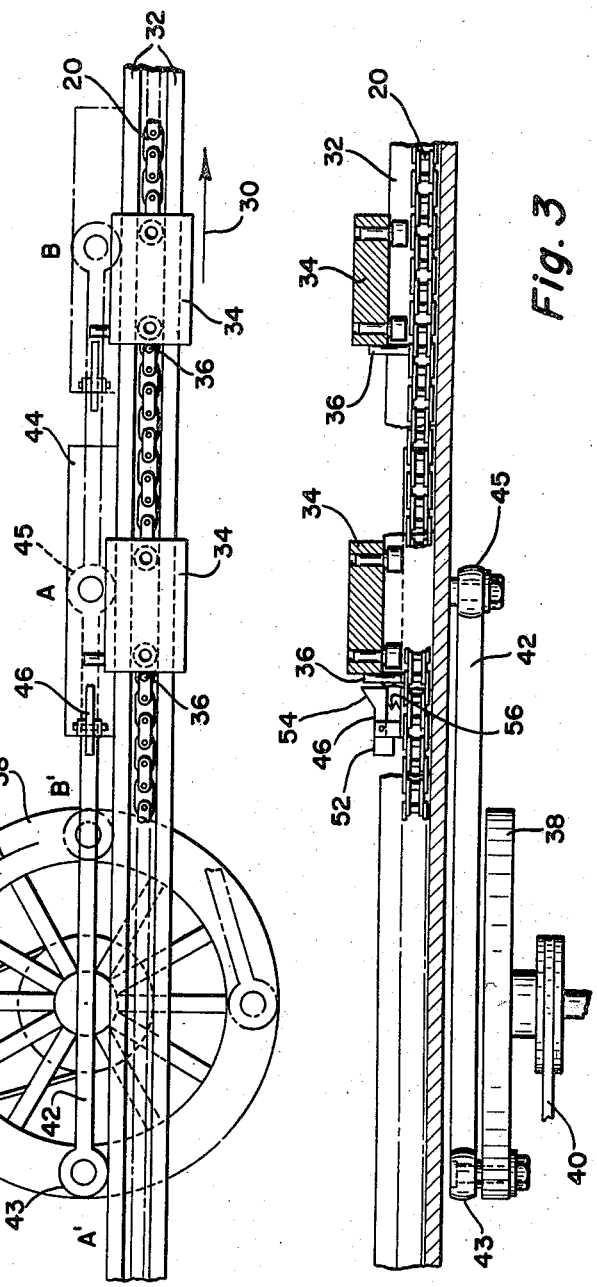
Fig. 3
INVENTOR.
Ernest R. Fausset
BY
His Attorney с
United States Patent Office 2,856,054
Patented Oct. 14, 1958

2,856,054

CONVEYING MECHANISM

Ernest R. Fausset, Ingalls, Ind., assignor to General Motors Corporation, Detroit, Mich., a corporation of Delaware Application December 8, 1953, Serial No. 396,933

4 Claims. (Cl. 198—19)

This invention relates to conveyors and workholders that are moved thereby, and is more particularly directed to a continuously moving endless conveyor which moves a workholder to a station where the workholder is caused to remain relatively stationary while the conveyor continues to move.

It is an object of the present invention to provide a method and apparatus for moving an endless conveyor so that at least one workholder is moved thereby to a work station where the movement of the workholder relative to the conveyor is interrupted for a predetermined period of time.

A further object of the present invention is to provide and continuously move an endless chain conveyor that has pins thereon adapted to engage and move a workholder to a station where a pawl on the end of a reciprocating crank arm that has a rate of travel greater than the rate of travel of the conveyor contacts and moves the workholder in a direction of travel and at a rate greater than the movement of the conveyor pin so that the workholder, when out of contact with the pawl, as it reciprocates in a direction opposite to the direction of travel of the conveyor, will remain relatively stationary relative to the conveyor until it is reengaged by the moving conveyor pin.

Further objects and advantages of the present invention will be apparent from the following description, reference being had to the accompanying drawing wherein a preferred embodiment of the present invention is clearly shown.

In the drawing:

Figure 1 is a plan view of an endless conveyor and a device according to the present invention for moving a workholder therealong;

Figure 2 is an enlarged fragmentary view of the device for moving the workholder along a moving conveyor; and Figure 3, partly in section shows an enlarged fragmentary side view of the device that moves a workholder along a moving conveyor.

In the drawings, one embodiment of the invention is shown wherein an endless chain conveyor 20 is moved continuously in the direction of arrow 30 by a sprocket 22 which is driven by an electric motor 24. The chain 20 is guided around the corners of a rectangular racetrack type frame 26 by suitably located guide sprockets 28.

Frame 26 is preferably formed of two parallel rails 32 which are spaced so the chain 20 may pass therebetween and are arranged so a plurality of workholders 34 may rest on and be guided therealong. The workholders 34 are contacted and moved by pins or protuberances 36 suitably spaced along the moving chain 20.

A crank wheel 38 which is located beneath the frame 26 is driven by a suitable means such as belt 40 so that its peripheral speed is greater than the lineal travel of chain 26. A crank arm 42 has one end 43 suitably pivoted on the rim portion of driving wheel 38 and the other end 45 pivoted on a guide part or block 44 which is carried on guide rails 32 so that the block 44 is slidable therealong. A pawl 46 located near the end 45 of crank arm 42 is adapted to contact a portion of workholder 44 and to move the workholder along the guide rails at a rate of travel faster than the rate of travel of conveyor 20 in a manner which will be hereinafter described.

Crank wheel 38, rotated in the direction of arrow 48, has a diameter sufficient in size so that the end 45 of crankcase 42 will move from position A to position B, as shown in Fig. 2, when the crank pin 43 on crank 42 is rotated from position A' to B'. The rotation of crank wheel 38 and the movement of crank arm 42 is synchronized with the location of pins 36 on the moving chain 20 so that pawl 46 will contact workholder 34 when the crank arm 42 is in the position A and will move the workholder 34 to position B at a rate of travel greater than the travel rate of chain 20. Thus, the workholder 34 will be moved out of contact with pin 36 and be moved to position B when the end 45 is moved to position B as the wheel 38 rotates end 43 from A' to B'. The workholder 34 will remain at rest during the period that crank arm 42 reciprocates from B to A and pin 36 travels from position A to position B, where it again contacts and moves workholder 34 from position B prior to movement of a succeeding workholder 34' to position B by pawl 46, as heretofore disclosed. The crank arm 42, when reciprocating, moves from position B to A as crank wheel 38 travels from position wherein pin 45 is moved from B' to A' and in so moving, first positions the workholder at position B and then passes beneath the succeeding workholder 34' which by this time is positioned by a second pin 36 in position A, so that pawl 46 may contact the succeeding workholder 34' for movement to position B.

The passage of the pawl 46 beneath workholder 34 is accomplished as the bottom portion of the workholder 34 passes over flat surface 52 of pawl 46 and over inclined surface 54 thereof so as to compress spring 56, thus permitting the pawl 46 to pass beneath the workholder and be repositioned for contacting a second workholder 34' when spring 56 restores the original position of the pawl 46.

From the foregoing, it is apparent that while workholder 34 is stationary at position B, the pin 36 from which workholder 34 has been moved continues to travel and will engage the workholder 34 and move the workholder 34 from position B before the succeeding workholder 34' is moved by pawl 46 to position B. Thus, the workholder 34 will remain in position B for a time as determined by the speed of advance chain 20, and the speed of advance of crank arm 42. During this time period, any suitable operation may be performed on an article, not shown, held on workholder 34. This operation may include a hand operation or a machine operation such as pressing, punching, riveting, etc., as may be required on the work.

It is apparent that any number of mechanisms of the type herein disclosed may be used with any number of workholders, so that a plurality of operations may be performed at work stations without changing the speed of travel of the chain conveyor. Further, it is manifest that the path of travel of the chain as governed by the track 26 may be of any desired shape such as rectangular, square, triangular or, for that matter circular, as will be apparent to anyone skilled in the art, and manifestly the time during which the workholder is stationary may be varied by changing the speed of operation of the various component parts.

While the embodiment of the present invention as herein disclosed, constitutes a preferred form, it is to be understood that other forms might be adopted.

What is claimed is as follows:

1. A device for interrupting movement of a normally moving workholder, comprising in combination; a workholder movable by a conveyor having a predetermined rate of continuous travel, and means including a reciprocal arm movable in synchronism with said conveyor for bodily moving said workholder relative to said conveyor over a predetermined distance to a predetermined position at a rate of travel greater than the travel of said conveyor whereby said workholder remains stationary relative to the conveyor for a predetermined period of time.

2. A device for interrupting movement of a normally moving workholder, comprising in combination; a workholder movable by a continuously extending conveyor of indeterminate length having a predetermined rate of continuous travel, and means including a reciprocal arm movable in sychronism with said conveyor for bodily moving said workholder relative to said conveyor a predetermined distance to a predetermined position at a rate of travel greater than the travel of said conveyor whereby said workholder will remain stationary relative to said moving conveyor for a predetermined period of time.

3. An apparatus for interrupting movement of a workholder, comprising in combination; a continuously extending conveyor adapted to continuously move at a predetermined rate of travel and having at least one protuberance thereon, a workholder adapted to be engaged by said protuberance and bodily moved thereby at the same rate of travel as the conveyor, and means including a reciprocal arm movable in synchronism with said conveyor for bodily moving said workholder relative to said conveyor at a predetermined distance to a predetermined position in the direction of movement of said conveyor and at a rate of travel greater than the travel of said conveyor whereby said workholder remains stationary relative to said moving conveyor for a predetermined period of time.

4. The apparatus as set forth in claim 3 wherein means for moving the workholder includes; a reciprocating crank arm having an end movable in a timed sequence relation and at a rate of travel greater than said protuberance, and a pawl on said end adapted for engaging a portion of said workholder for moving said workholder relative to said protuberance.

References Cited in the file of this patent

UNITED STATES PATENTS

| | | |
|---|---|---|
| 794,493 | Dickerson | July 11, 1905 |
| 2,259,748 | Hullhorst | Oct. 21, 1941 |
| 2,551,080 | Allen et al. | May 1, 1951 |
| 2,555,227 | Emerson | May 29, 1951 |